Patented Apr. 6, 1943

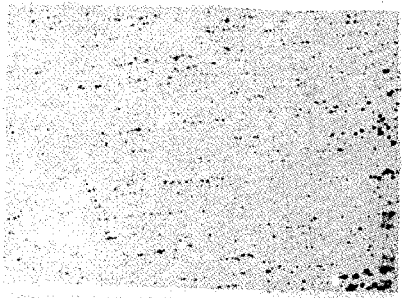
LONGITUDINAL x 100 UNETCHED (1% Pb)
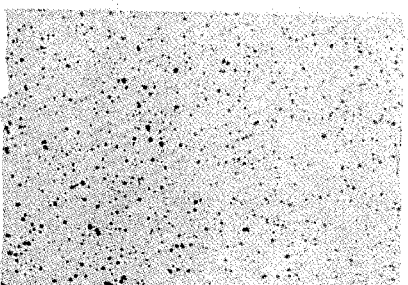
TRANSVERSE x 100 UNETCHED (1% Pb)
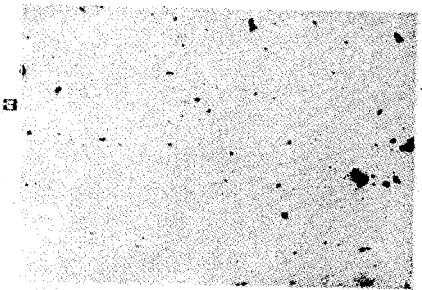
LONGITUDINAL x 500 UNETCHED (1% Pb)
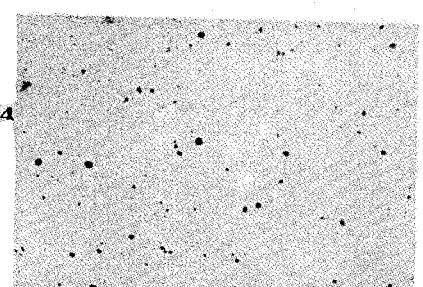
TRANSVERSE x 500 UNETCHED (1% Pb)
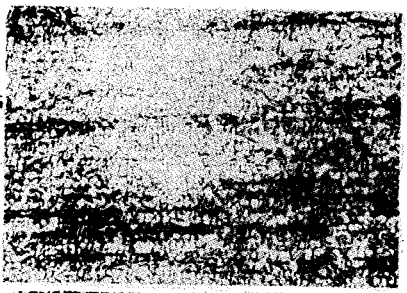
LONGITUDINAL x 100 ETCHED (1% Pb)
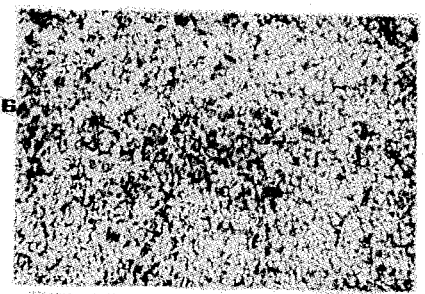
TRANSVERSE x 100 ETCHED (1% Pb)
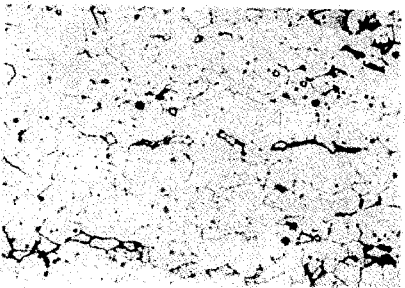
LONGITUDINAL x 500 ETCHED (1% Pb)
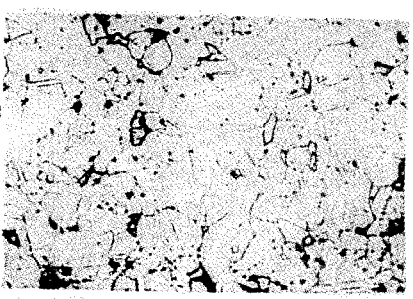
TRANSVERSE x 500 ETCHED (1% Pb)
INVENTOR
FREDERICK H. HEHEMANN
BY Tautmin & Tautmin
ATTORNEY

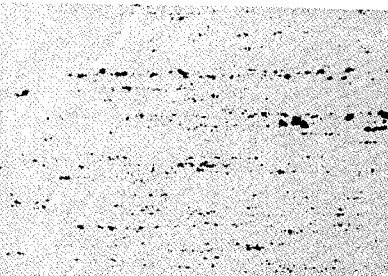
LONGITUDINAL × 100 UNETCHED (1¾% Pb)
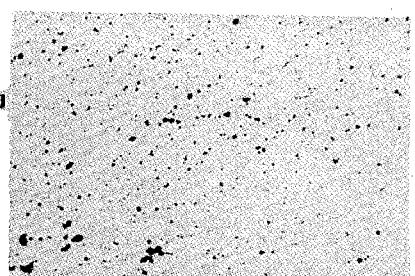
TRANSVERSE × 100 UNETCHED (1¾% Pb)
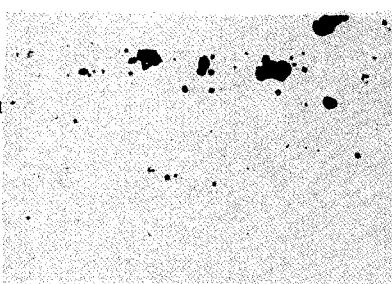
LONGITUDINAL × 500 UNETCHED (1¾% Pb)
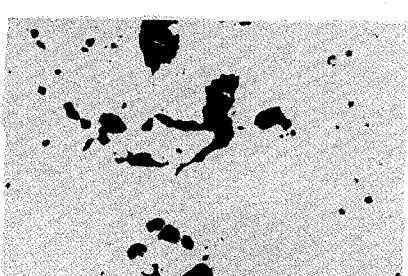
TRANSVERSE × 500 UNETCHED (1¾% Pb)
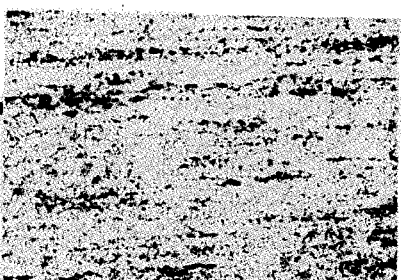
LONGITUDINAL × 100 ETCHED (1¾% Pb)
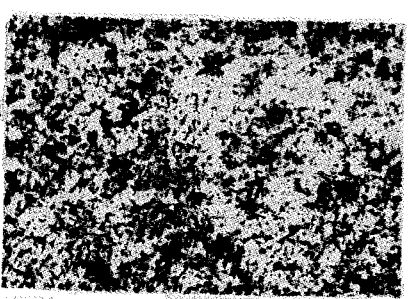
TRANSVERSE × 100 ETCHED (1¾% Pb)
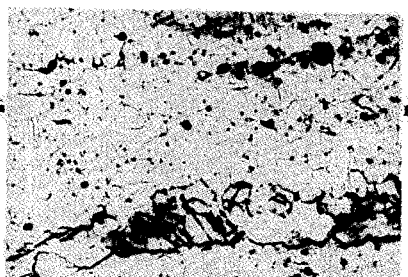
LONGITUDINAL × 500 ETCHED (1¾% Pb)
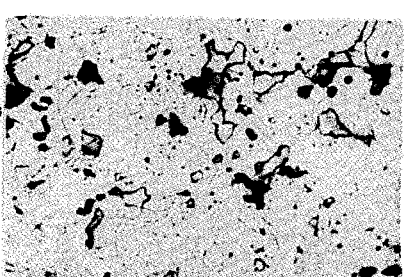
TRANSVERSE × 500 ETCHED (1¾% Pb)

2,315,700

UNITED STATES PATENT OFFICE 2,315,700

SILICON BRASS ROD

Frederick H. Hehemann, Cincinnati, Ohio, assignor to The Lunkenheimer Company, Cincinnati, Ohio, a corporation of Ohio Application April 12, 1941, Serial No. 388,339

8 Claims. (Cl. 75—155)

My invention relates to silicon brass alloys, and more particularly to silicon brass alloys containing lead which have free machining characteristics and can be cast or extruded into rods forming valve stems.

It is a principal object of this invention to provide an improved alloy material of the character described which may be readily machined, has improved resistance to corrosion and can be used under high pressure and temperature conditions.

It is another object of this invention to provide an alloy of copper, silicon, zinc and lead, the proportions of which, within the ranges hereinafter stated, give the physical characteristics desired.

It is still another object to provide an alloy that has free machining characteristics, but at the same time has high tensile strength, high yield point, high elongation and can be formed by the extrusion process.

These and other objects and advantages will be apparent from the following description taken in connection with the drawings.

In the drawings:

Figures 1 to 8 are microphotographic reproductions of my alloy which comprises one per cent lead.

Figures 9 to 16 are similar microphotographic reproductions of a modified alloy made according to this invention comprising one and three-quarters per cent lead.

Referring to the drawings:

Figures 1 and 2 show the fine scattering of lead particles and Figures 3 and 4 illustrate the size and distribution of these lead particles throughout the alloy.

Figures 5, 6, 7 and 8 show the mixed alpha-beta structure. The beta phase is represented by the discontinuous stringers, as shown in the longitudinal section and by the uniformly dispersed grains in the transverse section. The beta phase is the more brittle constituent and when present in the approximate amount shown serves to cause breaking up of the chips during machining of the metal alloy and thus improves its machinability. Figures 7 and 8 also illustrate the uniform dispersion of the lead particles throughout the alloy structure.

This alloy, containing one per cent lead, possesses very desirable free machining characteristics and it is believed to be attributed to the combination of the discontinuous stringers of the beta phase constituent and the fine, uniform dispersion of the lead particles throughout the mass. Another highly desirable characteristic of this alloy is its relative freedom from adverse directional properties.

In Figures 9 to 16 there are shown microphotographic reproductions of my ternary alloy containing one and three-quarters per cent lead. In Figures 9 and 10 a considerable amount of lead constituent is shown in the microstructure which has some tendency to gather into a chain-like formation. Some quite large particles of lead are shown by the higher magnification as illustrated in Figures 11 and 12.

This alloy also has the mixed alpha-beta structure, the alpha phase being continuous, as illustrated in Figures 13 to 16.

The alloy also possesses very desirable free machining properties, and the directional characteristics, as shown by the bend tests, are about the same as that of commercial free cutting brass rod materials.

In the practice of my invention I find that the following proportions and ranges should be observed in order to secure the results as described:

| Material | Percentage |
|---|---|
| Copper | 70 to 80 |
| Zinc | 15 to 29 |
| Silicon | 2.5 to 3 |
| Lead | 0.05 to 2.5 |

It is desirable, as the zinc decreases in amount, to increase the lead proportionately. Additions of manganese (up to 0.50%) and tin may also be present.

*Example No. 1*

One of the preferred specific proportions of the several elements of the alloy is as follows:

| Material | Percentage |
|---|---|
| Copper | 79 to 80 |
| Zinc | 17.5 to 19 |
| Silicon | 2.5 to 3 |
| Lead | 0.05 to 1.5 |

*Example No. 2*

| Material | Percentage |
|---|---|
| Copper | 77.40 |
| Zinc | 18.62 |
| Silicon | 2.64 |
| Lead | 1.00 |
| Manganese | 0.24 |
| Iron | 0.10 |

Example No. 3

| Material | Percentage |
|---|---|
| Copper | 78.25 |
| Zinc | 18.00 |
| Silicon | 2.50 |
| Lead | 1.25 |

Example No. 4

| Material | Percentage |
|---|---|
| Copper | 78.00 |
| Zinc | 17.50 |
| Silicon | 2.50 |
| Lead | 2.00 |

Example No. 5

| Material | Percentage |
|---|---|
| Copper | 77.76 |
| Zinc | 17.76 |
| Silicon | 2.90 |
| Lead | 1.16 |
| Manganese | 0.27 |
| Iron | 0.15 |

Example No. 6

| Material | Percentage |
|---|---|
| Copper | 77.26 |
| Zinc | 17.74 |
| Silicon | 2.98 |
| Lead | 1.68 |
| Manganese | 0.24 |
| Iron | 0.10 |

This material can be rolled, cast or extruded into rod stock. The melting point of the mixture is about 1000 degrees C. If it is desired to extrude the material to form rods, the extrusion temperature should be approximately 700 degrees to 750 degrees C. The material can be annealed at an annealing temperature of 750 degrees C. for one hour.

The alloy of Example No. 2, for instance, has been tested in comparison with the best silicon bronze valve stems, and has given the same results under test. This test for wearing qualities was conducted in valves operating under 200 lbs. pressure at 500 degrees F., the valves being opened and closed repeatedly. The objection to ordinary silicon bronze is its lack of free machining characteristics. Rods made from the alloy of this invention have substantially the same free machining characteristics as rods formed of brass and can be cut on automatic screw machines.

The physical characteristics of this alloy, according to physical tests that have been made, are as follows. Tests made at room temperature of rods made of the alloy of Example No. 5 show the following characteristic physical properties:

Tensile strength _____ 78,600
Yield point _____ 44,700
Elongation in 2" _____ 36
Rockwell B hardness:
    Cross section _____ 80
    Exterior surface _____ 90
Bend tests:
    Parallel _____ 60 degs. Broke
    Normal _____ 120 degs. OK In Example No. 6, physical tests showed the following:

Tensile strength _____ 78,500
Yield point _____ 38,900
Elongation in 2" _____ 30.7%
Rockwell B hardness:
    Cross section _____ 79
    Exterior surface _____ 89
Bend tests:
    Parallel _____ 20 degs. Broke
    Normal _____ 45 & 60 degs. Broke Tests conducted with rods made of similar silicon brass alloys in which lead was omitted with increased copper and zinc showed high ductility but were somewhat more difficult to machine than those containing lead. However, the lead free alloys were superior to the ordinary silicon bronzes as regards ease of working.

While the lead content does not appreciably affect the ductility, it does have a pronounced effect on the directional properties. The ductility at right angles to the direction of extrusion or rolling is very much reduced.

Alloy silicon brasses comprising approximately 1.00% lead, as given in Examples 2 and 5, are especially preferred since rods made from this composition were smoother than where higher amounts of lead were used. Moreover, the 1% lead alloys required less extrusion pressure on sample billets than similar alloys containing higher amounts of lead or none at all.

Valve stems and commercial rods made with my new alloy containing small amounts of lead have unexpectedly greatly improved the physical characteristics as compared with the prior silicon alloy brass products.

I desire to comprehend within my invention such modifications as may be necessary to adapt it to varying conditions and uses.

Having thus fully descried my invention, what I claim as new and desire to secure by Letters Patent is:

1. In an alloy capable of extrusion having characteristics of free machining with high resistance to heat, pressure and wear, the combination of from 70 to 80% copper, 2.5 to 3% silicon, 15 to 29% zinc and .05 to 2.5% lead.

2. In an alloy capable of extrusion having characteristics of free machining with high resistance to heat, pressure and wear, the combination of copper 79 to 80%, zinc 17.5 to 19%, silicon 2.5 to 3% and lead 0.05 to 1.5%.

3. In an alloy capable of extrusion having characteristics of free machining with high resistance to heat, pressure and wear, copper 77.40%, zinc 18.62%, silicon 2.64%, lead 1.00% manganese 0.24% and iron 0.10%.

4. In an alloy capable of extrusion having characteristics of free machining with high resistance to heat, pressure and wear, copper 78.00%, zinc 17.50%, silicon 2.50% and lead 2.00%.

5. An extruded alloy rod characterized by its relative freedom from adverse directional properties, its mixed alpha-beta structure in which the alpha phase is continuous and in which the beta phase is represented by discontinuous stringers in longitudinal section and by uniformly dispersed grains in transverse section, and having characteristics of free machining with high strength and resistance to pressure, corrosion, temperature and wear, comprising 70 to 80 per cent copper, 2.5 to 3 per cent silicon, 15 to 29 per cent zinc and 0.05 to 2.5 per cent lead.

6. An extruded alloy rod characterized by its relative freedom from adverse directional properties, its mixed alpha-beta structure in which the alpha phase is continuous and in which the beta phase is represented by discontinuous stringers in longitudinal section and by uniformly dispersed grains in transverse section, and having characteristics of free machining with high strength and resistance to pressure, corrosion, temperature and wear, comprising 79 to 80 per cent copper, 17.5 to 19 per cent zinc, 2.5 to 3 per cent silicon and 0.05 to 1.5 per cent lead.

7. An extruded alloy rod characterized by its relative freedom from adverse directional properties, its mixed alpha-beta structure in which the alpha phase is continuous and in which the beta phase is represented by discontinuous stringers in longitudinal section and by uniformly dispersed grains in transverse section, and having characteristics of free machining with high strength and resistance to pressure, corrosion, temperature and wear, comprising 77.4 per cent copper, 18.62 per cent zinc, 2.64 per cent silicon, 1.0 per cent lead, 0.24 per cent manganese and 0.10 per cent iron.

8. An extruded alloy rod characterized by its relative freedom from adverse directional properties, its mixed alpha-beta structure in which the alpha phase is continuous and in which the beta phase is represented by discontinuous stringers in longitudinal section and by uniformly dispersed grains in transverse section, and having characteristics of free machining with high strength and resistance to pressure, corrosion, temperature and wear, comprising 78 per cent copper, 17.5 per cent zinc, 2.5 per cent silicon and 2 per cent lead.

FREDERICK H. HEHEMANN.